United States Patent
Nelson

(10) Patent No.: US 10,051,855 B2
(45) Date of Patent: Aug. 21, 2018

(54) ANIMAL TRAP SYSTEM

(71) Applicant: Allen Roy Nelson, Oakdale, MN (US)

(72) Inventor: Allen Roy Nelson, Oakdale, MN (US)

( * ) Notice: Subject to any disclaimer, the term of this patent is extended or adjusted under 35 U.S.C. 154(b) by 206 days.

(21) Appl. No.: 14/740,188

(22) Filed: Jun. 15, 2015

(65) Prior Publication Data
US 2016/0360742 A1 Dec. 15, 2016
US 2017/0094961 A9 Apr. 6, 2017

Related U.S. Application Data

(60) Provisional application No. 61/979,762, filed on Apr. 15, 2014.

(51) Int. Cl.
*A01M 23/24* (2006.01)
*A01M 23/30* (2006.01)

(52) U.S. Cl.
CPC .......... *A01M 23/245* (2013.01); *A01M 23/30* (2013.01)

(58) Field of Classification Search
CPC .......................... A01M 23/245; A01M 23/30
See application file for complete search history.

(56) References Cited

U.S. PATENT DOCUMENTS

| | | | | | |
|---|---|---|---|---|---|
| 1,473,242 | A | * | 11/1923 | Marshall | A01M 23/30 43/81 |
| 1,709,199 | A | * | 4/1929 | Thayer | A01M 23/30 43/81 |
| 1,743,389 | A | * | 1/1930 | Poncelet | A01M 23/245 43/81 |
| 1,792,774 | A | * | 2/1931 | Snider | A01M 23/245 43/81 |
| 2,836,006 | A | * | 5/1958 | Beck | A01M 23/245 43/96 |
| 3,769,742 | A | * | 11/1973 | Spain | A01M 23/30 43/81 |
| 4,030,230 | A | * | 6/1977 | Souza | A01M 23/30 43/81 |
| 4,779,374 | A | * | 10/1988 | Feldman | A01M 23/30 43/81 |
| 5,488,800 | A | * | 2/1996 | O'Hara | A01M 23/30 43/81 |

(Continued)

OTHER PUBLICATIONS

"Mousetraps as Training Aids", relevant comments dated Dec. 5, 2007, <https://www.homesteadingtoday.com/threads/mousetrapsastrainingaids. 220379/>, accessed Jun. 22, 2017.*

*Primary Examiner* — Michael H Wang
(74) *Attorney, Agent, or Firm* — Dunlap Bennett & Ludwig, PLLC

(57) ABSTRACT

An animal trap system that improves the reliability of a pre-existing animal trap is provided. The animal trap system may include a thin membrane forming an opening, wherein the opening is dimensioned to at least partially circumscribe a trigger mechanism of the pre-existing animal trap, while a remaining portion of the trap mat overlays a substantial portion of a supporting surface and/or base of the pre-existing animal trap where the animal may be dispose when setting off the trigger mechanism. The underlying surface of the trap mat may have a relatively low friction coefficient so as to cause a fleeing animal to slide and or slip along the supporting surface and/or base.

8 Claims, 4 Drawing Sheets

(56) References Cited

U.S. PATENT DOCUMENTS

| | | | | |
|---|---|---|---|---|
| 5,546,696 | A | * | 8/1996 | Parker, Jr. ............. A01M 23/30 426/1 |
| 7,954,275 | B2 | * | 6/2011 | Frisch .................... A01M 23/30 43/114 |
| 2003/0110679 | A1 | * | 6/2003 | Collins ................. A01M 23/30 43/81 |
| 2010/0115824 | A1 | * | 5/2010 | Frisch .................... A01M 23/28 43/81 |
| 2010/0154288 | A1 | * | 6/2010 | Frisch ................. A01M 23/005 43/81 |
| 2011/0162255 | A1 | * | 7/2011 | Burstrom .............. A01M 23/26 43/90 |
| 2012/0167449 | A1 | * | 7/2012 | Frisch .................... A01M 23/30 43/81 |
| 2013/0036658 | A1 | * | 2/2013 | Bayne ................... A01M 23/30 43/81 |
| 2013/0263494 | A1 | * | 10/2013 | Kay ...................... A01M 23/24 43/58 |

* cited by examiner

ANIMAL TRAP SYSTEM

CROSS-REFERENCE TO RELATED APPLICATION

This application claims the benefit of priority of U.S. provisional application No. 61/979,762, filed 15 Apr. 2014, the contents of which are herein incorporated by reference.

BACKGROUND OF THE INVENTION

The present invention relates to animal traps and, more particularly, to an animal trap mat that prevents the animal from escaping an animal trap.

Current animal traps and systems try to be quicker than the animals; however, often the animals can move faster than the traps can close. In essence, many mice and rats have reflexes so quick that they move off of a trap, after it is tripped, before it can catch them.

As can be seen, there is a need for an animal trap system that prevents an animal from moving off an animal trap, thereby improving the reliability of the pre-existing animal trap.

SUMMARY OF THE INVENTION

In one aspect of the present invention, an animal trap mat includes a thin sheet of material; and an opening formed within the thin sheet of material, wherein the thin membrane is dimensioned so that the opening closely circumscribes at least a portion of a trigger mechanism of a pre-existing animal trap.

In another aspect of the present invention, an animal trap system include an animal trap mat having a thin sheet of material; and an opening formed within the thin sheet of material; and an animal trap having a supporting surface; and a trigger mechanism, wherein the thin sheet of material is dimensioned so that the opening closely at least partially circumscribes the trigger mechanism, while the thin sheet of material is dimensioned to at least substantially cover the base.

These and other features, aspects and advantages of the present invention will become better understood with reference to the following drawings, description and claims.

DETAILED DESCRIPTION OF THE INVENTION

Figure 1:
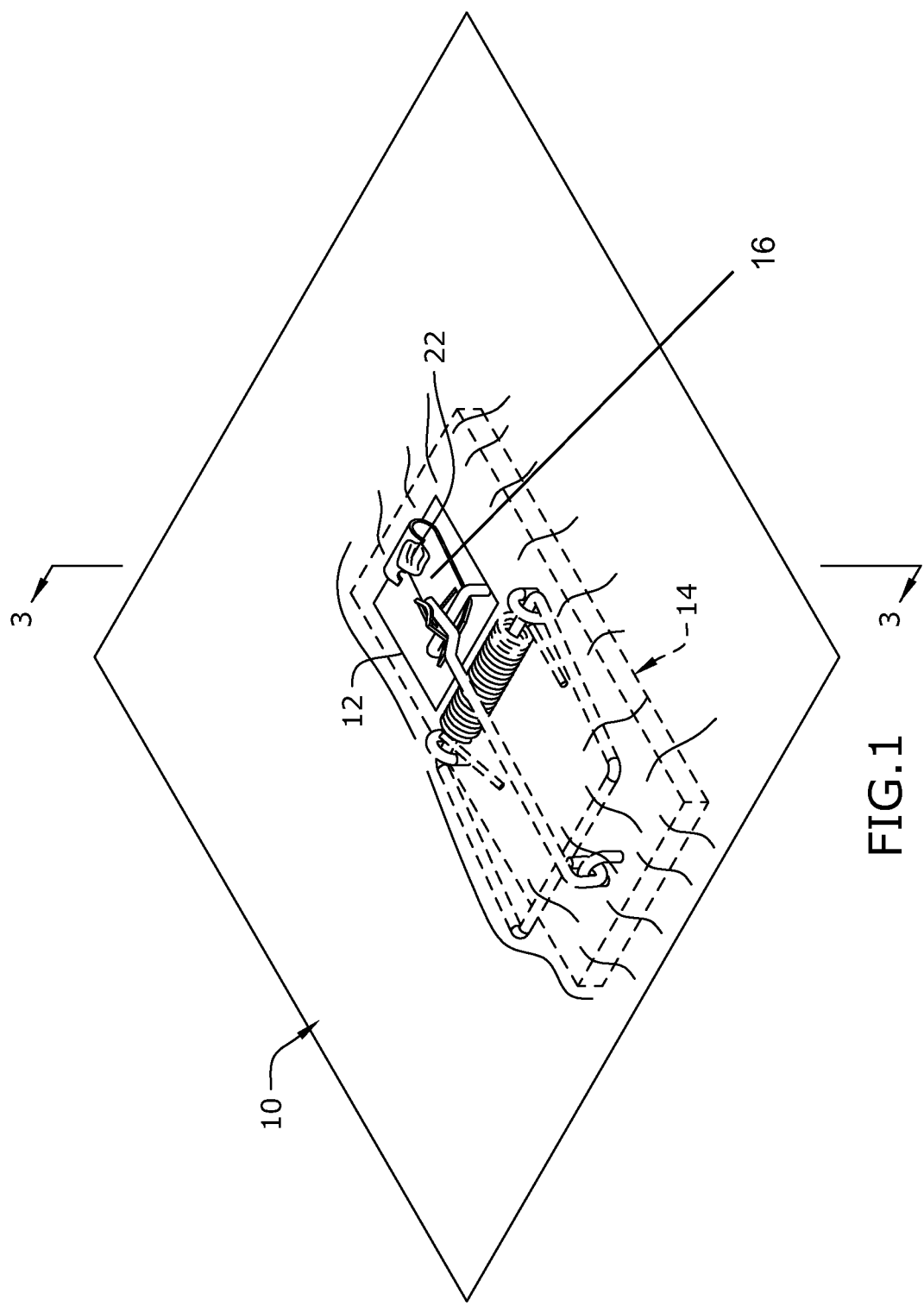
FIG. 1 is a perspective view of an exemplary embodiment of the present invention, shown in use.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an animal trap system that improves the reliability of a pre-existing animal trap. The animal trap system may include a thin membrane forming an opening, wherein the opening is dimensioned to at least partially circumscribe a trigger mechanism of the pre-existing animal trap, while a remaining portion of the trap mat overlays a substantial portion of a supporting surface and/or base of the pre-existing animal trap where the animal may be dispose when setting off the trigger mechanism. The underlying surface of the trap mat may have a relatively low friction coefficient so as to cause a fleeing animal to slide and or slip along the supporting surface and/or base.

Referring to FIGS. 1 through 6, the present invention may include an animal trap mat 10. The animal 18 may be a rat, mouse, rodent or other pest. The trap mat 10 may be a lightweight, thin membrane or sheet of material having a first surface 28 and an opposing second surface 30. The second surface 30 may have a low friction coefficient so as to facilitate sliding and slipping of the second surface 30 when urged across a supporting surface. The supporting surface may include, but not be limited to a base 15 of a pre-existing animal trap 14, including but not limited to a spring-actuated animal trap. In certain embodiments, the first surface 28 may include a friction coefficient greater than the second surface 30. The first surface 28 may otherwise be adapted so that a paw 20 of the animal 18 may gain traction thereon. In an alternative embodiment, the first surface 28 may be different material, or the same material as the second surface 30, but with dimples or other features to provide traction thereon. In yet another embodiment, the first surface 28 is adapted to have greater traction than the second surface 30.

The trap mat 10 may form an opening 12. In certain embodiments, the opening may be disposed inward from its periphery, preferably centrally located. In certain embodiments, the opening 12 may be dimensioned and disposed to closely circumscribe a trigger mechanism 16 of the animal trap 14 so as that the remaining portion of the trap mat 10 substantially overlays the supporting surface and/or base 15 of said animal trap 14, as illustrated in FIG. 1. As a result, the trigger mechanism 16 and its attendant bait 22 protrude through the opening 12. The trigger mechanism being connected to a striking or killing component of the animal trap 14, such as the kill bar 17 illustrated in FIG. 2.

Figure 5:
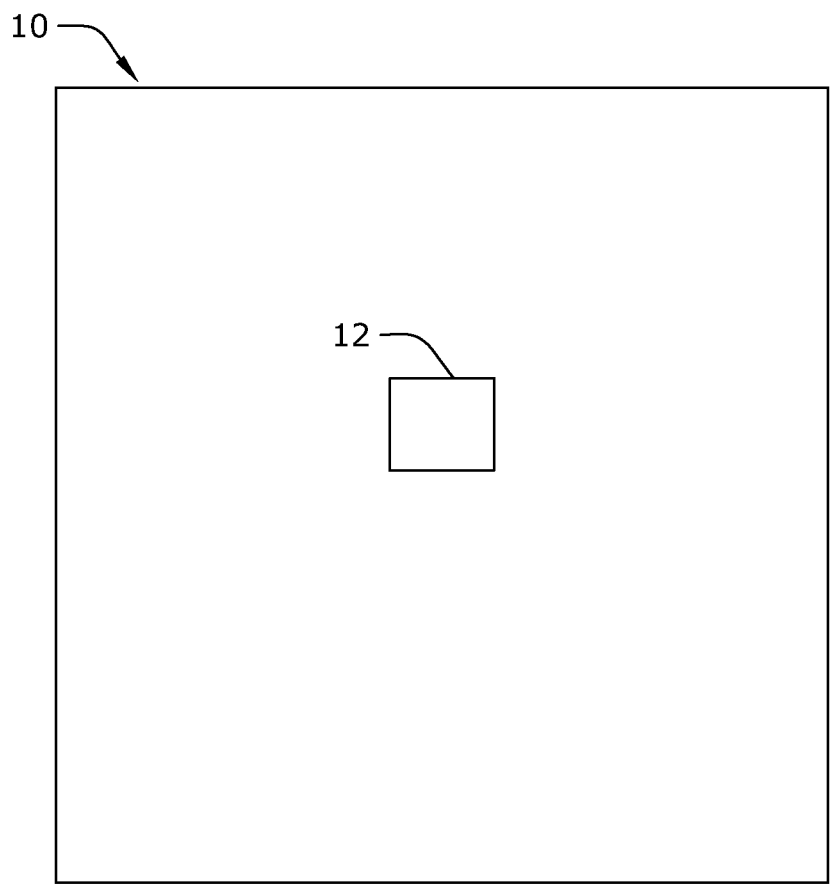
FIG. 5 is a top view of an exemplary embodiment of the present invention.
Figure 6:
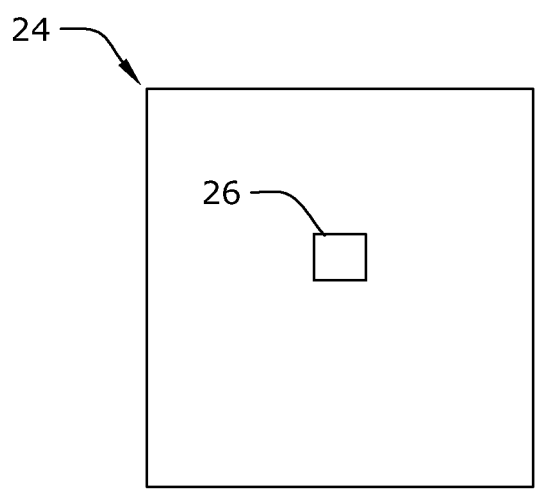
FIG. 6 is a top view of an exemplary embodiment of the present invention.

The opening 12 may be formed along the periphery of the trap mat 10, and so more of a cut-out that partially circumscribes the trigger mechanism of the animal trap 14, yet functions in accordance with the present invention as described herein. The trap mat 24 may also be dimensioned and adapted to be operative with differently sized animal traps, and so have a differently sized and/or disposed opening 26 as illustrated in FIGS. 5 and 6.

Figure 2:
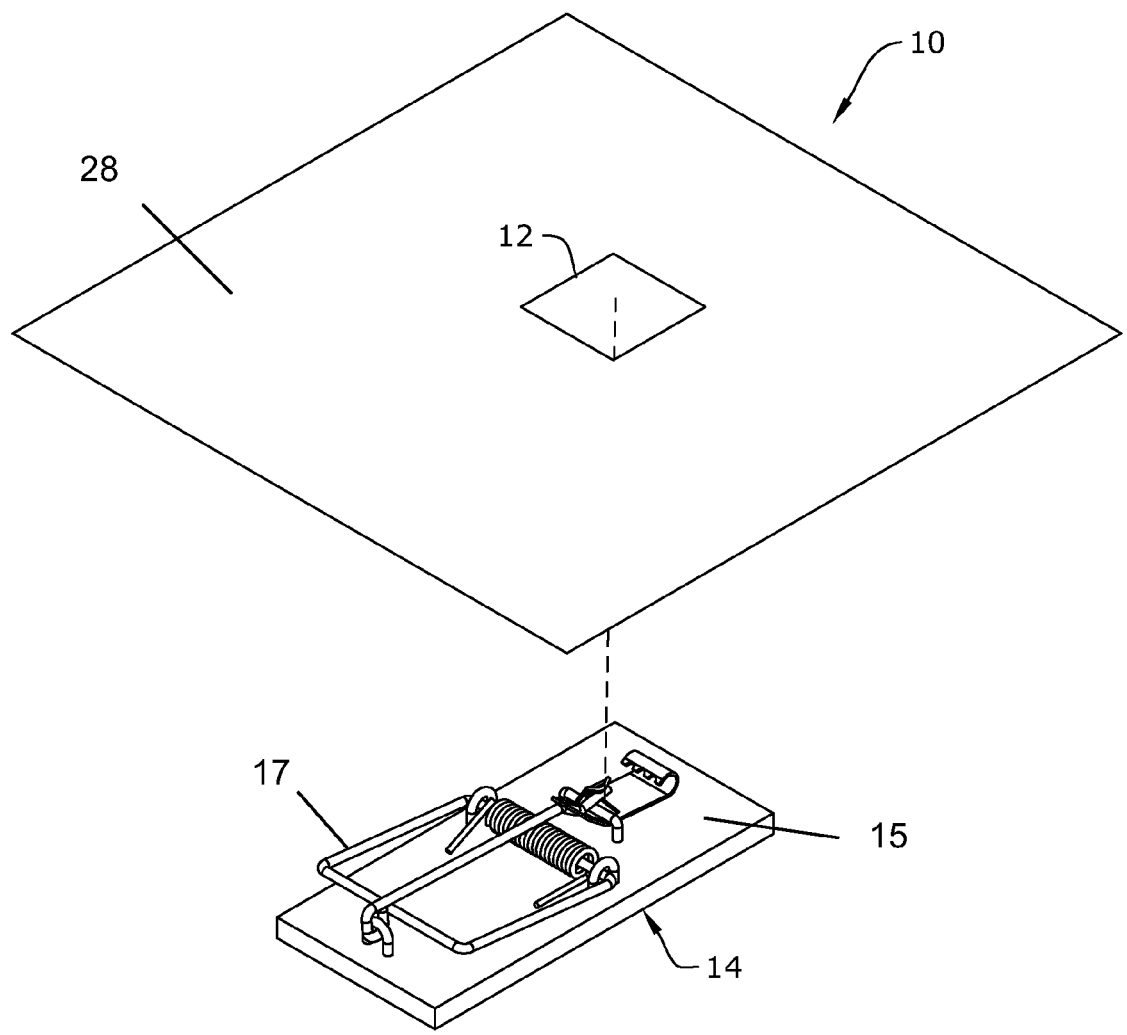
FIG. 2 is an exploded view of an exemplary embodiment of the present invention, demonstrating its application and improvement to a pre-existing animal trap.

The method of using the present invention may include the following. The animal trap mat 10 disclosed above may be provided. A user may place the trap mat 10 over the existing animal trap 14 so that its trigger mechanism 16 and bait 22 protrude through the opening 12, while the remaining portion of the trap mat 10 overlays substantially all of the supporting surface and/or base 15 of the animal trap 14, as illustrated in FIGS. 1 and 2.

Figure 3:
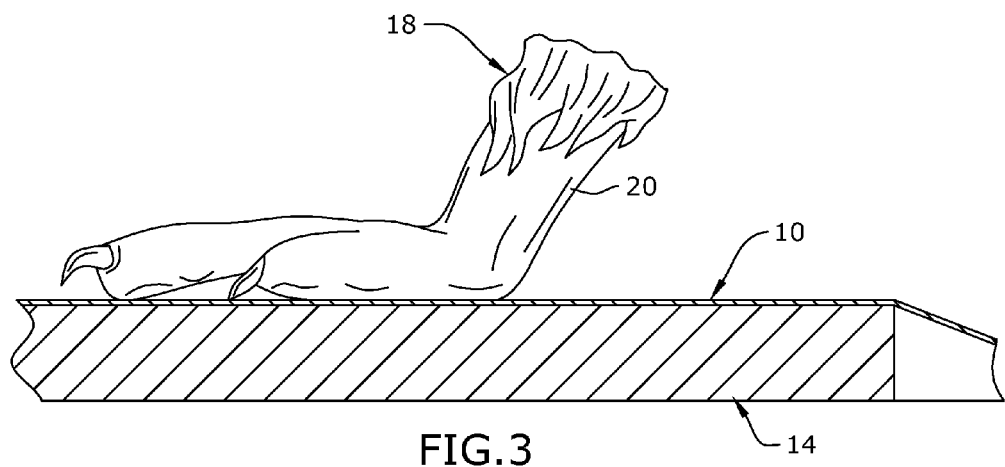
FIG. 3 is a section view of an exemplary embodiment of the present invention, taken along line 3-3 of FIG. 1.
Figure 4:
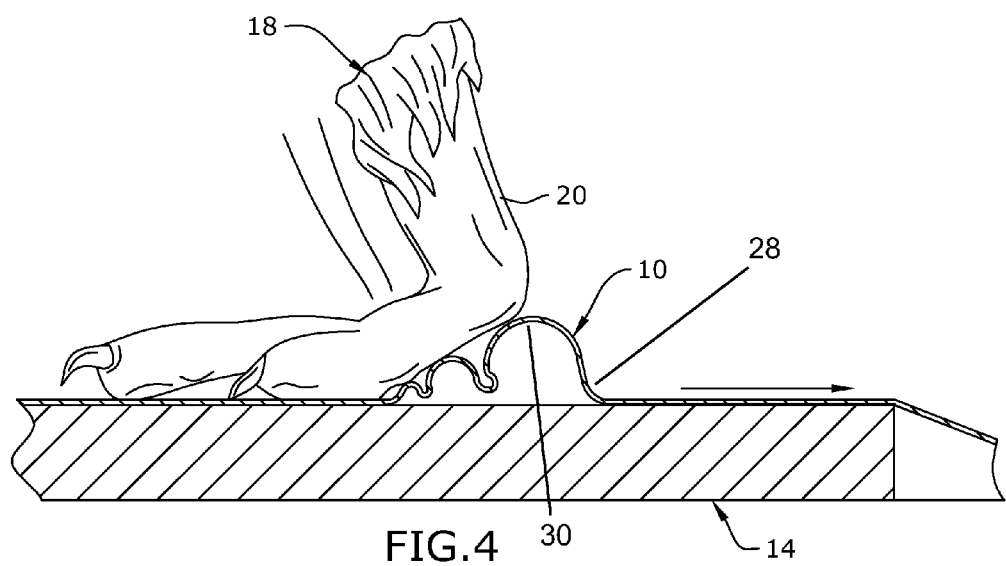
FIG. 4 is a section view of an exemplary embodiment of the present invention, demonstrating an operative effect.

When the animal 18 occupies the supporting surface and/or base 15, each of its paws 20 thereon will be standing on the first surface 28, thereby sandwiching an underlying portion of the second surface 30 against the supporting surface and/or base 15, as illustrated in FIG. 3. When the animal trap 14 is sprung, for example, in a spring-actuated animal trap when the spring-loaded kill bar is released (most likely when the trigger mechanism disposed in the opening 12 is set off), the animal 18 will reflexively attempt to use its paws 18 against the first surface 18 to flee from the trap 14. When reflexively fleeing, its paws 18 may dig into or otherwise frictionally engage the first surface 28, whereby the underlying second surface 30 will freely slide and/or slip along the supporting surface and/or base 15 because of the second surface's 30 low friction coefficient, as illustrated in FIG. 4. In the process, the trap mat 10 may bundle or gather, yet the animal 20 will not, relative to the supporting surface and/or base 15, be moving at its normal reflexive acceleration and velocity as its paws 18 slide and slip relative to the base 15.

The end result of the animal 18 not gaining sufficient traction to flee, preventing the animal 18 from escaping the base 15 or a strike/kill zone, is for the animal 18 to be caught in the animal trap 14. After the animal 18 is captured or killed by the pre-existing trap 14, the remaining portion of the trap mat 10 may be used to wrap up and discard the body of the animal 18.

The animal trap 14 could be any animal trap 14 having a supporting surface and/or base 14 and a trigger mechanism 16. In certain embodiments, the animal trap system may not have the opening 12, yet sill impose the sliding and slipping needed to improve the reliability of the pre-existing trap 14.

It should be understood, of course, that the foregoing relates to exemplary embodiments of the invention and that modifications may be made without departing from the spirit and scope of the invention as set forth in the following claims.

What is claimed is:

1. A method of improving an animal trap having a supporting surface and a trigger mechanism disposed thereon, the supporting surface terminating at one or more edges, comprising:
   providing a thin sheet of material; and
   laying said sheet of material generally flat over the supporting surface, wherein said thin sheet of material overlays one of said one or more edges;
   cutting an opening in the thin sheet of material so that when the thin sheet of material is lain over the supporting surface the opening closely circumscribes the trigger mechanism;
   wherein the thin sheet of material comprises a first surface and an opposing second surface, wherein the second surface has a lower friction coefficient than the first surface, and wherein the thin sheet of material is lain so that the second surface engages the supporting surface.

2. The method of claim 1, wherein the first surface has greater traction than the second surface.

3. The method of claim 1, wherein a portion of said sheet of material slides relative to the supporting surface when said predetermined animal accelerates on a portion of sheet of material overlaying the supporting surface.

4. The method of claim 1, wherein said sheet of material is adapted to have an operative effect to bundle or gather relative to the supportive surface when said predetermined animal digs into and accelerates on a portion of sheet of material overlaying the supporting surface.

5. The method of claim 1, wherein the second surface is adapted to freely slide relative to the supporting surface.

6. The method of claim 1, wherein said at least a portion of the trigger mechanism protrudes through the opening.

7. The method of claim 1, wherein the opening is inward of a periphery of the thin sheet of material.

8. The method of claim 1, further comprising the step of wrapping up thin sheet of material around the animal successfully killed by the improved animal trap.

\* \* \* \* \*